(12) United States Patent
Taylor et al.

(10) Patent No.: US 7,026,603 B2
(45) Date of Patent: Apr. 11, 2006

(54) FAULT LOCATOR FOR TESTING A COMPLEX OPTICAL CIRCUIT

(75) Inventors: Ralph Taylor, Lee's Summit, MO (US); Harold King, Kansas City, MO (US); Michael Bequette, Lansing, KS (US); James R. Stone, Lake Tapawingo, MO (US); Russ May, Prairie Village, KS (US)

(73) Assignee: DIT-MCO International Corporation, Kansas City, MO (US)

( * ) Notice: Subject to any disclaimer, the term of this patent is extended or adjusted under 35 U.S.C. 154(b) by 246 days.

(21) Appl. No.: 10/306,235

(22) Filed: Nov. 26, 2002

(65) Prior Publication Data

US 2004/0101270 A1    May 27, 2004

(51) Int. Cl.
*G01J 1/04*    (2006.01)
(52) U.S. Cl. .................. 250/227.15; 356/73.1
(58) Field of Classification Search ........ 250/227.15–227.18; 356/73.1; 398/20, 21; 385/12, 385/13
See application file for complete search history.

(56) References Cited

U.S. PATENT DOCUMENTS

| 4,565,966 A |   | 1/1986 | Burr et al. ............. 324/519 |
| 6,753,520 B1 | * | 6/2004 | Spirin et al. .......... 250/227.16 |
| 6,765,396 B1 | * | 7/2004 | Barror ................... 324/753 |

* cited by examiner

*Primary Examiner*—Thanh X. Luu
(74) *Attorney, Agent, or Firm*—Hovey Williams LLP

(57) ABSTRACT

A fiber optic tester (10) broadly comprises a testing unit (16) to take measurements across two test points (27), a processing unit (18) to locate faults by analyzing the measurements, a switching unit (20) that can connect termination points (13) of a electrical circuit (12) to the test points (27) in a sequence controlled by the processing unit (18), and a fiber unit (22) to test a optical circuit (14). The tester (10) may also include an electrical harness (24) or an optical harness to connect the electrical circuit (12) to the switching unit (20) or the optical circuit (14) to the fiber unit (22). The processing unit (18) is preferably programed with interconnection information of the circuits (12, 14) and internal characteristics of the tester (10). Using the interconnection information and the internal characteristics, the processing unit (18) may accurately detect faults within the circuits (12, 14).

4 Claims, 9 Drawing Sheets

FAULT LOCATOR FOR TESTING A COMPLEX OPTICAL CIRCUIT

BACKGROUND OF THE INVENTION

1. Field of the Invention

The present invention relates to fiber optic testers. More particularly, the present invention provides a fiber optic tester that can automatically and accurately test electrical and optical circuits in a manufacturing environment.

2. Description of Prior Art

Fiber optics and optical circuits are increasingly used in production of aircraft, vehicles, and equipment. Such optical circuits must be tested, to ensure high quality and reliability. Automated testing of optical circuits is becoming necessary as optical circuits become more complex making manual testing laborious and subject to human error.

For example, handheld fiber testing units are widely used to test optical circuits. However, handheld fiber testing units cannot test more than one fiber strand at a time and require technicians to repeatedly perform several complicated steps flawlessly in order to obtain accurate results. For example, a technician is typically required to individually connect both ends of each fiber strand to a handheld fiber testing unit before individually testing each fiber strand.

Handheld fiber testing units also typically require significant training and are not well suited to operation by unspecialized labor. For example, the steps required to correctly connect ends of fiber strands to a handheld fiber testing unit may be complex. Any error in making such connects drastically effects test results. Thus, training and skill are extremely important to insure accurate test results with handheld fiber testing units.

Furthermore, such units are typically very sensitive and cannot withstand rough treatment commonly found in manufacturing environments. For example, hand held fiber testing units are typically destroyed, if dropped or otherwise jarred. Thus, handheld fiber testing units are better suited to use with few fiber strands by highly trained and specialized labor in laboratory environments.

Finally, most fiber testing units are not able to accurately test relatively short fiber strands, such as 20–30 feet. Most fiber strands are rated for attenuation over long distances, such as kilometers, because attenuation over short distances is relatively minimal. In fact, short fiber stands typically have less than one decibel of attenuation. Thus, errors made in testing short fiber strands are typically more significant than those made in testing long fiber strands.

Additionally, electrical circuits are also commonly used in production of aircraft, vehicles, and equipment along with optical circuits. Currently, technicians must use two different devices to test optical and electrical circuits. For example, technicians may be required to use a handheld fiber testing unit to test optical circuits and another device to test electrical circuits. Such devices commonly operate quite differently, thereby requiring technicians to be familiar with two completely different testing procedures.

Accordingly, there is a need for an improved fiber optic tester that overcomes the limitations of the prior art.

SUMMARY OF THE INVENTION

The present invention overcomes the above-identified problems and provides a distinct advance in the art of testers. More particularly, the present invention provides a fiber optic tester that can automatically and accurately test both an electrical and an optical circuit. The tester broadly comprises a testing unit to take measurements across two test points, a processing unit to locate faults by analyzing the measurements taken by the testing unit, a switching unit that can connect termination points of the electrical circuit to the test points in a sequence controlled by the processing unit, and a fiber unit to test the optical circuit. The tester may also include an electrical harness to connect the electrical circuit to the switching unit and/or an optical harness to connect the fiber unit to the optical circuit. Alternatively, the switching unit and/or the fiber unit may be designed to mate directly with the circuits.

ELECTRICAL TESTING

The electrical circuit may include several hundred termination points, with each termination point preferably wired to at least one other termination point according to design requirements and application of the electrical circuit. For example, the electrical circuit may include termination points, such as A1, A2, B1, B2, C1, C2, and X1. Additionally, the electrical circuit may include a plurality of terminal blocks, such as TB1, TB2, and TB3. The electrical circuit may also include other common electrical elements, such as, resistors, capacitors, inductors, lamps, switches, diodes, and fuses. Furthermore, the electrical circuit may comprise any combination of circuit board traces and/or bundles of various wiring types, such as coaxial wire, twisted pair, shielded wire, and individual conductors.

The electrical circuit may be of the type used in aircraft, other vehicles, backplanes, appliances, black-boxes, and/or other complicated equipment. For example, the electrical circuit may be designed to provide interconnections for a Boeing model 767 commercial jet airliner. Alternatively, the electrical circuit may be designed to provide interconnections for a light-rail train, an automobile, printed circuit board, or a super computer. In any case, the electrical circuit may include many wire runs or interconnections each of differing length, wire size, and/or type. Additionally, the termination points may terminate in individual connectors, be grouped into collective connectors, or use a combination of connectors for the termination points.

The testing unit preferably comprises a first and second test point, such as T1 and T2, a precision current source connected across the test points, and a precision voltage sensor also connected across the test points. The testing unit preferably takes a differential voltage measurement using the voltage sensor to sense voltage across the test points. The testing unit also preferably takes a resistance measurement using the current source to apply current through the test points and the voltage sensor to sense voltage across the test points, which is directly proportional to the resistance measurement. Dividing the voltage across the test points by the current through the test points yields the resistance measurement, according to Ohm's Law.

Similarly, the testing unit preferably takes a capacitance measurement using the current source to apply current through the test points and the voltage sensor to sense voltage across the test points. However, in taking the capacitance measurement, the testing unit preferably times how long it takes to reach a specified voltage across the test points, which is directly proportional to the capacitance measurement. In other words, the longer it takes to reach the specified voltage, the higher the capacitance measurement.

The testing unit and the switching unit preferably operate together and under control of the processing unit. As discussed above, the testing unit preferably includes two test points, and yet is preferably able to take the resistance measurement between each pair of termination points and the capacitance measurement across each termination point and a reference point, which is preferably an unused termination point, such as X1. Thus, the switching unit facilitates connecting the test points to each of the termination points.

The switching unit preferably comprises a pair of single pole single throw relays, such as R1, R2, R3, R4, R5, and R6, connected to each termination point. A first relay is preferably connected to T1 and a second relay is preferably connected to T2. The relays are preferably controlled by an addressing unit that individually energizes the relays according to digital address words received from the processing unit over an address bus. The address words direct which termination point should be connected to which test point, and thus instruct the addressing unit which relays should be energized.

As discussed above, the processing unit is preferably programed with the electrical circuit's interconnection information, thereby allowing the processing unit to know which combinations of termination points should result in high and low resistance measurements. Thus, the processing unit preferably compares each resistance measurement to the interconnection information to identify which termination points are in conflict and in what manner the termination points conflict, thereby determining what faults exist in the electrical circuit. However, it is typically insufficient for the processing unit to simply determine which termination points are in conflict, since this doesn't effectively inform a service technician where he or she should begin in order to actually locate and fix the faults. Without more information, the technician must spend many hours trying to locate and fix the faults.

In order to help the technician locate and fix the faults, the processing unit is preferably able to use the measurements to determine where each fault is located in the electrical circuit. For example, if TB1 is shorted to X1, then the testing unit would measure relatively low resistance between any combination of A1, B1, and X1. While the processing unit may expect the resistance measurement to be relatively low between A1 and B1, the resistance measurement between A1 and X1 is expected to be relatively high. Additionally, the resistance measurement between B1 and X1 is also expected to be relatively high. Since the resistance measurements involving X1 are relatively low, then the processing unit determines that there must be a short-circuit fault (SCF) to X1 somewhere between A1 and B1.

The processing unit next identifies where, between A1 and B1, the SCF is located by comparing the corresponding resistance measurements. As an example, suppose the resistance measurement between A1 and B1 is found to be approximately 0.2461 Ohms, the resistance measurement between A1 and X1 is found to be approximately 0.2166 Ohms, and the resistance measurement between B1 and X1 is found to be approximately 0.1085 Ohms. Since the resistance measurement between B1 and X1 is the smallest value, the SCF must be closer to B1 than to A1.

The processing unit can be even more precise by adding the resistance measurement between A1 and X1 to the resistance measurement between B1 and X1 which yields a sum of approximately 0.3251. The sum, in this case, inherently includes the resistance between X1 and the SCF measured twice and the resistance measurement between A1 and B1. It can be seen that, the sum is approximately 0.0790 Ohms greater than the resistance measurement between A1 and B1. Therefore, the resistance between X1 and the SCF is approximately 0.0395 Ohms.

In order to locate the SCF with respect to A1 and B1, the 0.0395 resistance can be subtracted from the resistance measurement between A1 and X1 and the resistance measurement between B1 and X1. In this case, the resistance between A1 and the SCF is approximately 0.1771 Ohms and the resistance between B1 and the SCF is approximately 0.0690 Ohms. The processing unit then calculates a resistance ratio (RR) of approximately 72%, in this case, indicating that the SCF is located approximately 72% of a conductor length (CL) between A1 and B1. Thus, in this case, the processing unit preferably indicates that the SCF is located approximately 72% of the CL from A1.

To be even more precise, the interconnection information programmed into the processing unit preferably includes details as to electrical characteristics and CLs as well as wire sizes and types used throughout the electrical circuit. For example, suppose the CL from A1 to TB1 is supposed to be approximately 151 inches and the CL from B1 to TB1 is supposed to be approximately 59 inches. Applying the RR to a total conductor length (TCL) between A1 and B1 of approximately 210 inches yields that the SCF must be approximately 151 inches from A1 or substantially adjacent TB1. Therefore, the processing unit preferably indicates that the SCF is located substantially adjacent TB1. In this case, it is anticipated that the technician's first actions will center around examining TB1. Thus, by identifying the location of the fault and nearby items, such as TB1, the tester of the present invention guides the technician directly to the location of the fault.

Additionally, the interconnection information may comprise positional information relating to physical paths of the electrical circuit. Using the positional information and the determined location of the fault, the processing unit can determine an actual position of the fault. For example, assuming that the electrical circuit is installed in a vehicle, the processing unit can inform the technician where the fault may be physically found with reference to the vehicle. More specifically, the processing unit may inform the technician that the fault is located behind a specific access panel, within a specific section of conduit, or in a specific junction box, etc.

It should be apparent that finding faults comprises detecting and reporting which termination points are in conflict. Locating faults carries this much further in actually determining and reporting where faults are located along the electrical circuit, drastically cutting time that the technician must spend looking for the fault. Finally, positioning faults further advances the art by determining and reporting where faults may be found with reference to their surroundings.

In preferred embodiments, the tester is capable of locating or positioning faults within the electrical circuit. However, in alternative embodiments, the tester may not actually locate faults and may be limited to finding faults. Additionally, in still other embodiments, the tester may include very limited, if any, electrical testing capability. Although, it is anticipated that the tester will be most useful if able to fully test both the electrical circuit and the optical circuit.

The processing unit locates open-circuit faults by performing calculations on the capacitance measurement. For example, if there is an open-circuit fault (OCF) between TB2 and TB3, then the testing unit would measure relatively high resistance between either A2 or C2 and either B2 or C1. However, programmed with the interconnection information, the processing unit expects relatively low resistance between any combination of A2, B2, C1, and C2. Additionally, in this case, the resistance measurement between A2 and C2 is also relatively low, as expected. Furthermore, in this case, the resistance measurement between B2 and C1 is relatively low, as expected. Therefore, the processing unit determines that A2 and C2 are both connected to TB2 and B2 and C1 are both connected to TB3, as expected. Thus, the processing unit determines that the OCF is located somewhere between TB2 and TB3.

In order to more accurately locate the OCF, the processing unit next compares the corresponding capacitance measurements with respect to the reference point, such as X1. As an example, suppose the capacitance measurement for A2 is approximately 1247 picoFarads (pF), the capacitance measurement for B2 is approximately 308 pF, the capacitance measurement for C1 is approximately 323 pF, and the capacitance measurement for C2 is approximately 1236 pF. It should be noted that the capacitance measurement for A2 is expected to be substantially identical to the capacitance measurement for C2, since A2 is connected to C2 through the electrical circuit. Likewise, the capacitance measurement for B2 is expected to be substantially identical to the capacitance measurement for C1. In the above example, there are slight variations which may occur for any number of reasons, such as repeatability of the voltage sensor and other internal influences. In any case, more accurate results may be obtained by averaging the values expected to be identical. Thus, in this case, an average for the TB2 side of the OCF is approximately 1242 pF and an average for the TB3 side of the OCF is approximately 316 pF. Then, the processing unit calculates a capacitance ratio (CR) of approximately 80%, indicating that the OCF is located approximately 80% of the TCL between A2 to C2 and B2 to C1.

Additionally, using the interconnection information, the processing unit can calculate the TCL or amount of conductive path on each side of the OCF. For example, suppose the CL from A2 to TB2 is approximately 196 inches, suppose the CL from C2 to TB2 is approximately 84 inches, suppose the CL from B2 to TB3 is approximately 38 inches, suppose the CL from C1 to TB3 is approximately 36 inches, and suppose the CL from TB2 to TB3 is approximately 42 inches. In this case, the TCL is approximately 396 inches. Applying the CR, the OCF is located at approximately 317 inches along the TCL between A2 to C2 and B2 to C1. Since the CL from A2 to C2 is approximately 280 inches, the OCF must be approximately 37 inches from TB2 and approximately 5 inches from TB3. In this case, the processing unit preferably indicates that the OCF is approximately 37 inches from TB2 and approximately 5 inches from TB3, leading the technician to first examine TB3.

In the above examples, the RR and the CR that are calculated by the processing unit may or may not precisely locate the fault. For example, either the RR or the CR may be off by as much as 10%. With simple electrical circuits, a 10% error may be acceptable and still adequately guide the technician to the fault. However, with more complex or very long electrical circuits, the 10% error may not be acceptable requiring the technician to examine several terminal blocks.

The majority of the error experienced by the tester may be due to internal influences caused by manufacturing tolerances of internal components and other factors. Thus, the tester can be even more accurate by compensating for such internal influences. There are at least two internal influence reduction methods (IIRM) that the tester of the present invention may use in compensating for internal influences. A first IIRM involves simply reversing the test points used in calculating the RR and the CR during a first iteration, such as that described above. For example, if the switching unit was directed to connect A1 to T1 and B1 to T2, then the processing unit performs a second iteration directing the switching unit to connect A1 to T2 and B1 to T1. Upon completion of the second iteration, the processing unit preferably averages the RRs and the CRs developed during the first and second iterations. In this manner, the processing unit can minimize at least some of the internal influences of the tester.

A second IIRM involves the processing unit subtracting values stored in a tare log, which will be discussed in more detail below, from each measurement taken by the testing unit. As will become apparent, this effectively subtracts the internal influences of the tester from the calculations used to develop the RR and the CR. Additionally, the processing unit may develop an extremely accurate RR and CR by using a combination of both the first IIRM and the second IIRM.

The tare log is developed during calibration of the tester and effectively stores internal characteristics of the tester. These internal characteristics, such as an internal resistance and an internal capacitance, contribute to the internal influences described above. For example, a total ratio of the resistance measurement between A1 and X1 to the resistance measurement between B1 and X1 is approximately 67%. It can be seen that, the total ratio differs from the RR by 5% of the TCL, which is directly related to the influences of the resistance between X1 and the SCF. The internal characteristics of the tester may effect the RR and the CR in a similar manner. Thus, the processing unit preferably subtracts the internal resistance and the internal capacitance of the tester as described above as was done for the resistance between X1 and the SCF.

The internal resistance is preferably determined by first shorting the switching unit where the electrical circuit or the electrical harness would normally be connected. Then, the processing unit directs the switching unit to cycle through every possible combination of termination points, while the testing unit takes the resistance measurements. The processing unit logs each resistance measurement in the tare log for each combination of termination points, thereby identifying the internal resistance of the fault locator without the electrical harness.

Additionally, the electrical harness may be shorted where the electrical circuit would normally be connected. Then, the processing unit again directs the switching unit to cycle through every possible combination of termination points, while the testing unit takes the resistance measurements. The processing unit again logs each resistance measurement in the tare log for each combination of termination points, thereby identifying the internal resistance of the fault locator with the electrical harness.

Alternatively, the internal resistance of the electrical harness may be calculated. For example, individual internal resistances for each conductor of the electrical harness can be calculated based on length, cross-section, and material for each conductor. Each individual internal resistance may be stored in the tare long and added to the internal resistance for the corresponding combination of termination points.

Similarly, the internal capacitance is preferably determined with the electrical harness connected to the switching unit but disconnected from the electrical circuit. The processing unit then directs the switching unit to cycle through each termination point, while the testing unit takes the capacitance measurements. The processing unit logs each capacitance measurement in the tare log for each termination point, thereby identifying the internal capacitance of the tester with the electrical harness. Additionally, or where the electrical harness is not used, the switching unit itself may be left disconnected from both the electrical harness and the electrical circuit. In this case, the processing unit logs each capacitance measurement in the tare log for each combination of termination points, thereby identifying the internal capacitance of the tester without the electrical harness. It is important to note that where the electrical harness is used, the tare log preferably contains the internal characteristics of the tester both with and without the electrical harness.

The processing unit can not only improve the accuracy of the RR and the CR, as described above, but may even locate faults within the tester itself, using the internal characteristics stored in the tare log. For example, if the internal resistance of the tester with the electrical harness is greater than the resistance measurement calculated during testing of the electrical circuit, then the SCF must be located somewhere within the tester or the electrical harness. The processing unit may also determine more precisely where the SCF is located using the internal resistance associated of the tester without the electrical harness. For example, if the resistance measurement calculated during testing of the electrical circuit is between the internal resistance of the tester with and without the electrical harness, then the SCF must be located within the electrical harness. Alternatively, if the resistance measurement calculated during testing of the electrical circuit is less than the internal resistance of the tester without the electrical harness, then the SCF must be located within the tester itself. It is important to note that the processing unit may locate both SCFs and OCFs within the tester itself and/or the electrical harness using the procedures discussed above.

It can be seen that the tester uses percentages and ratios in locating the faults. This allows the processing unit to disregard environmental concerns, such as temperature effects on the electrical circuit, since the concerns will effect the tester, the electrical circuit, and the electrical harness, thereby biasing all measurements in a similar manner. Thus, using ratios effectively negates any errors environmental concerns may otherwise induce.

FIBER OPTICAL TESTING

The fiber unit preferably allows the tester to perform a light attenuation measurement on each of a plurality of fiber strands within the optical circuit. The attenuation measurement is similar to the resistance measurement described above. Each fiber strand preferably includes two termination points, such as F1, F2, F3, and F4, with one of those termination points on either end of the optical circuit.

Thus, the interconnection information associated with the optical circuit is expected to be simpler than that associated with the electrical circuit. For example, the interconnection information associated with the optical circuit is expected to include information as to which pairs of termination points are expected to be interconnected. The interconnection information may also include information, such as fiber sizes, lengths, and types.

The fiber unit is preferably designed to individually test each fiber strand and preferably comprises a plurality of fiber optic light ports, with at least one light port for each termination point of the optical circuit. Each light port preferably comprises a light transmitter to transmit light into one of the fiber strands through an optical coupler, a light monitor to monitor the light from the light transmitter through the coupler, and a light receiver to receive light from the light transmitter through one of the fiber strands. The light transmitter preferably comprises a light emitting diode (LED) powered by a constant current source.

The coupler preferably divides the light transmitted by the light transmitter into two equal halves, such as a fiber power (PF) and a monitor power (PM). The coupler preferably directs PF toward one of the fiber strands of the optical circuit and PM to the light monitor. The coupler also preferably divides the light received from one of the fiber strands into two equal haves, such as a receiver power (PR) and a waste power (PW). It should be noted the PW is preferably directed toward the transmitter and has virtually no significance.

Thus, the coupler allows the tester to transmit and receive light with each light port through each fiber strand. Using the coupler, the tester may test each fiber strand in both directions, without any form of fiber switching or reversing of connectors. In fact, all fiber components are preferably solid-state resulting in a durable and rugged tester that can be moved around in a production environment and still be relied upon to make accurate, stable, and repeatable attenuation measurements.

The light monitor preferably produces a monitor voltage (VM), which is preferably logarithmically proportional to PM, or the light received from the light transmitter through the coupler. The light receiver is preferably similar to the light monitor and preferably produces a receiver voltage (VR), which is preferably logarithmically proportional to PR, or the light received from the fiber strand through the coupler.

As discussed above, two light ports are preferably used to test each fiber strand. For example, the light transmitter of a first light port is preferably used to transmit the light into one of the fiber strands, with the light monitor of the first light port monitoring that light transmitter. At the same time, the light receiver of a second light port is preferably used to receive light from that fiber strand. Thus, the light monitor detects how much light is transmitted into that fiber strand while the light receiver detects how much light is received from that fiber strand.

The light monitor and the light receiver are preferably connected to a monitor differential amplifier and a receiver differential amplifier, respectively. The receiver amplifier preferably amplifies VR approximately twice as much as the monitor amplifier amplifies VM. The differential amplifiers preferably amplify VM and VR with respect to a reference ground bus. The differential amplifiers are preferably connected to an analog bus switch that provides functionality similar to the switching unit described above. The analog bus switch preferably connects either the monitor differential amplifier or the receiver differential amplifier to one of the test points of the testing unit according to instructions received by the processing unit. For example, with T1 connected to one of the monitor differential amplifiers and T2 connected to one of the receiver differential amplifiers through the analog bus switch, the voltage sensor can take the voltage measurement between VM and VR for one of the fiber strands.

It should be obvious that PR is substantially half of PF minus any attenuation loss in that fiber strand. Since PM substantially equals PF, PR is expected to be substantially half of PM minus the attenuation loss in that fiber strand. As discussed above, VM is preferably proportional to PM and VR is preferably proportional to PR. Additionally, the receiver amplifier preferably amplifies VR such that VR is expected to be substantially equal to VM minus the attenuation loss in that fiber strand. Thus, the voltage measurement between VM and VR is indicative of the attenuation loss in that fiber strand.

The processing unit preferably indicates the attenuation measurement for each fiber strand. Additionally, if any attenuation measurement exceeds a programmed attenuation limit, the processing unit also preferably indicates that the associated fiber strand has failed. For example, the tester may take attenuation measurements of a specific fiber strand in first and second directions. If the attenuation limit is approximately 4 dB and the attenuation measurement is approximately 3.8 dB in the first direction and approximately 4.1 dB in the second direction, then the processing unit preferably indicates both attenuation measurements and that the specific fiber strand has failed.

As discussed above, the tare log is developed during calibration of the tester and stores internal characteristics of the tester. The internal characteristics may include attenuation characteristics of the fiber unit. Thus, the processing unit can compensate for internal characteristics of the fiber unit, as well as other internal influences of the tester, as described above.

The processing unit of the tester is preferably controlled and monitored through a user interface program. The program preferably allows the technician to view and print a report detailing the measurements taken from the circuits. Additionally, the program may allow the technician to provide the interconnection information. Furthermore, the program may allow the technician to specify the manner in which the processing unit tests the circuits.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
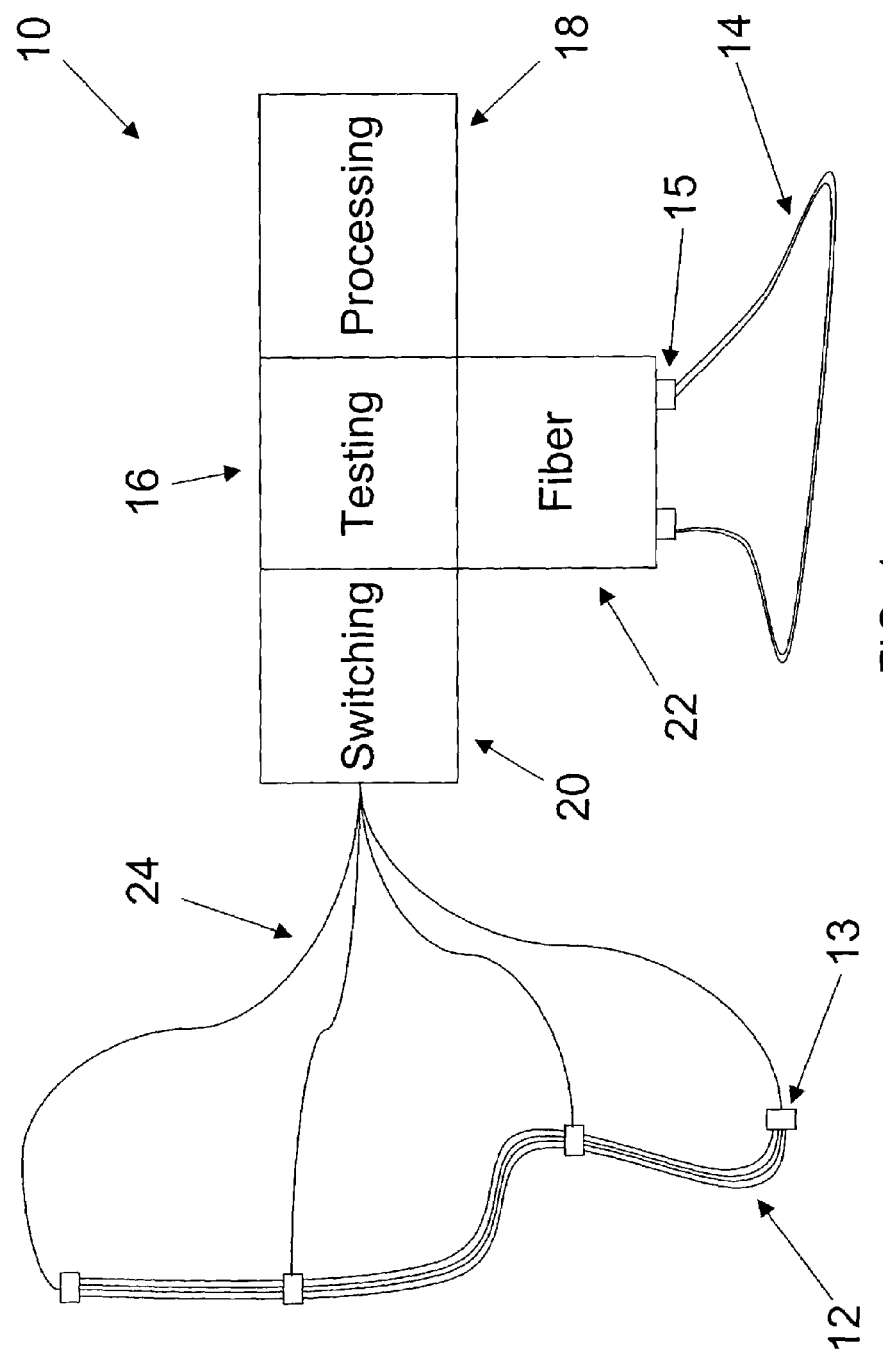
FIG. 1 is a block diagram of a tester constructed in accordance with a preferred embodiment of the present invention connected to a electrical circuit and a optical circuit.

Referring to FIG. 1, the preferred fiber optic tester 10 constructed in accordance with a preferred embodiment of the present invention is illustrated connected to an electrical circuit 12 having a plurality of termination points 13 and an optical circuit 14 also having a plurality of termination points 15. The tester 10 broadly comprises a testing unit 16 to take measurements, a processing unit 18 to analyze the measurements taken by the testing unit 16, a switching unit 20 that can connect the electrical circuit 12 to the testing unit 16 in a sequence controlled by the processing unit 18, and a fiber unit 22 that can be used to test the optical circuit 14. In a preferred embodiment, the tester 10 also includes an electrical harness 24 designed to connect the electrical circuit 12 to the switching unit 22 and/or an optical harness to connect the fiber unit 22 to the optical circuit 14. Alternatively, the switching unit 20 and/or the fiber unit 22 may be designed to mate directly with the circuits 12, 14.

ELECTRICAL TESTING

The electrical circuit 12 may include several hundred termination points 13, with each termination point 13 wired to at least one other termination point 13 according to design requirements and application of the electrical circuit 12. For example and referring also to FIG. 2, the electrical circuit 12 may include termination points, such as A1, A2, B1, B2, C1, C2, and X1 interconnected as shown. It is important to note that while FIG. 2 only shows seven termination points 13, in the interest of simplicity and clarity, it is to be understood that the electrical circuit 12 is expected to be much more complex. Additionally, the electrical circuit 12 may include a plurality of terminal bocks 26, such as TB1, TB2, and TB3. The electrical circuit 12 may also include other common electrical elements, such as resistors, capacitors, inductors, lamps, switches, diodes, and fuses. Furthermore, the electrical circuit 12 may comprise any combination of circuit board traces and/or bundles of various wiring types, such as coaxial wire, twisted pair, shielded wire, and individual conductors.

The electrical circuit 12 may be of the type used in aircraft, other vehicles, backplanes, appliances, black-boxes, and/or other complicated equipment. For example, the electrical circuit 12 may be designed to provide interconnections for a Boeing model 767 commercial jet airliner. Alternatively, the electrical circuit 12 may be designed to provide interconnections for a light-rail train, an automobile, printed circuit board, or a super computer. In any case, the electrical circuit 12 may include many wire runs each of differing length, wire size, and/or type. Additionally, the termination points 13 may terminate in individual connectors, be grouped into collective connectors, or use a combination of connectors.

As will be discussed in greater detail below, the tester 10 is preferably programmed with interconnection information which is unique to the electrical circuit 12 and/or the optical circuit 14. However, it is anticipated that the tester 10 will be used to test many different circuits. For example, a specific aircraft may include more than one unique circuit. While the tester 10 must be programmed for each unique circuit, the tester 10 may be used to test each unique circuit in the specific aircraft or may be used to test unique circuits from several aircraft.

For example, it is commonplace in modern manufacturing to break down a complex task into several smaller tasks and perform each of the smaller tasks at a different place or time in a manufacturing process. Thus, the manufacturing process may incorporate several testers 10, with each tester 10 programmed to test only one of several unique circuits that go into the specific aircraft. In this manner, each tester 10 may be programmed once and then used to test many unique circuits each destined to go into a different specific aircraft. Alternatively, the manufacturing process may utilize only one tester 10 and reconfigure that tester 10 to test each unique circuit that goes into the specific aircraft.

Figure 3:
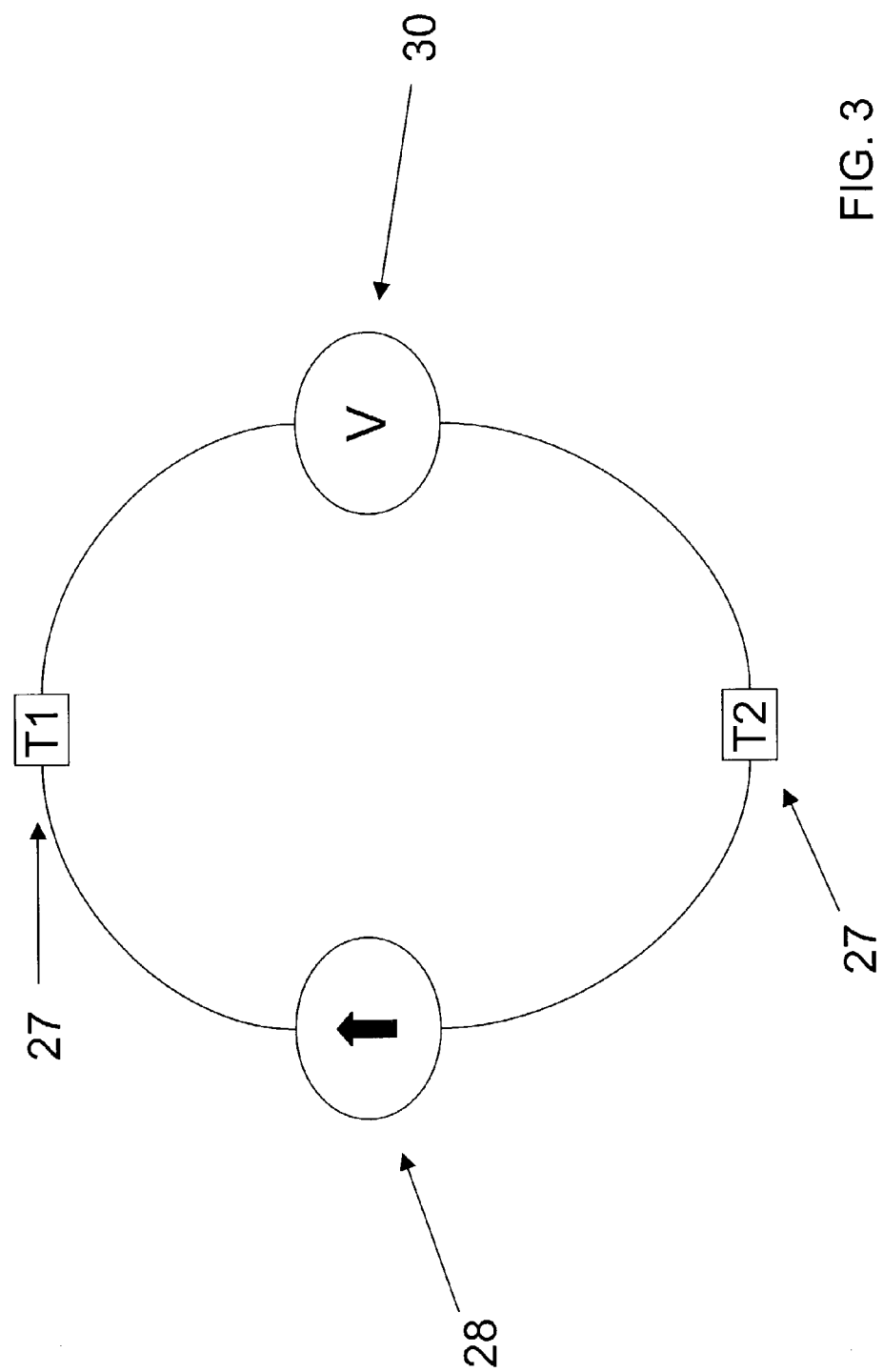
FIG. 3 is a schematic of a testing unit of the tester.

Referring also to FIG. 3, the testing unit 16 preferably comprises a first and second test point 27, such as T1 and T2, a precision current source 28 connected across the test points 27, and a precision voltage sensor 30 also connected across the test points 27. The testing unit 16 preferably takes a differential voltage measurement using the voltage sensor 30 to sense voltage across the test points 27. Additionally, the testing unit 16 preferably takes a resistance measurement using the current source 28 to apply current through the test points 27 and the voltage sensor 30 to sense voltage across the test points 27, which is directly proportional to the resistance measurement. Dividing the voltage across the test points 27 by the current through the test points 27 yields the resistance measurement, according to Ohm's Law. Alternatively, the testing unit 16 may use any other commonly used technique to take the resistance measurement.

Similarly, the testing unit 16 preferably takes a capacitance measurement using the current source 28 to apply current through the test points 27 and the voltage sensor 30 to sense voltage across the test points 27. However, in taking the capacitance measurement, the testing unit 16 preferably times how long it takes to reach a specified voltage across the test points 27, which is directly proportional to the capacitance measurement. In other words, the longer it takes to reach the specified voltage, the higher the capacitance measurement. Alternatively, the testing unit 16 may use any other commonly used technique to take the capacitance measurement.

The testing unit 16 preferably communicates the measurements to the processing unit 18 over a measurement bus as digital data words. In an alternative embodiment, the testing unit 16 may provide a voltage analog signal proportional to the voltage measurement, a resistance analog signal proportional to the resistance measurement, and a capacitance analog signal proportional to the capacitance measurement. In this case the testing unit 16 relies on an analog to digital converter in the processing unit 18 to convert the analog signals into the digital data words. In still another alternative embodiment, the testing unit 16 may not include any calculating capability. As such, the testing unit 16 may apply current through the test points 27 according to instructions from the processing unit 18 and provide the processing unit 18 with the voltage across the test points 27, in either digital or analog form. In this manner, the processing unit 18 itself may calculate the measurements. Thus, the testing unit 16 may actually take the measurements or may merely facilitate or assist the processing unit 18 in taking the measurements.

The testing unit 16 and the switching unit 20 may be designed specifically for the electrical circuit 12. For example, the testing unit 16 and the switching unit 20 may be designed to test high voltage electrical circuits. As such, the testing unit 16 and the switching unit 20 may be designed to operate at up to 2000 volts. Alternatively, the testing unit 16 and the switching unit 20 may be designed to test high current electrical circuits. As such, the testing unit 16 and the switching unit 20 may be designed to operate at up to 100 amps.

However, the testing unit 16 and the switching unit 20 may be designed to test both high voltage and high current electrical circuits. Furthermore, the tester 10 may be capable of testing both high voltage and/or high current electrical circuits as well as low voltage and/or low current electrical circuits. In this case, the testing unit 16 and the switching unit 20 may be modular and replaceable in order to test different electrical circuits. Alternatively, the testing unit 16 and the switching unit 20 may be designed to test both high voltage and/or high current electrical circuits as well as low voltage and/or low current electrical circuits without requiring replacement.

The testing unit 16 and the switching unit 20 preferably operate together and under control of the processing unit 18. As discussed above, the testing unit 16 preferably includes two test points 27, and yet is able to take the resistance measurement between each pair of termination points 13 and the capacitance measurement across each termination point 13 and a reference point, which is preferably an unused termination point, such as X1. Thus, the switching unit 20 facilitates connecting the test points 27 to each of the termination points 13 of the electrical circuit 12.

Figure 4:
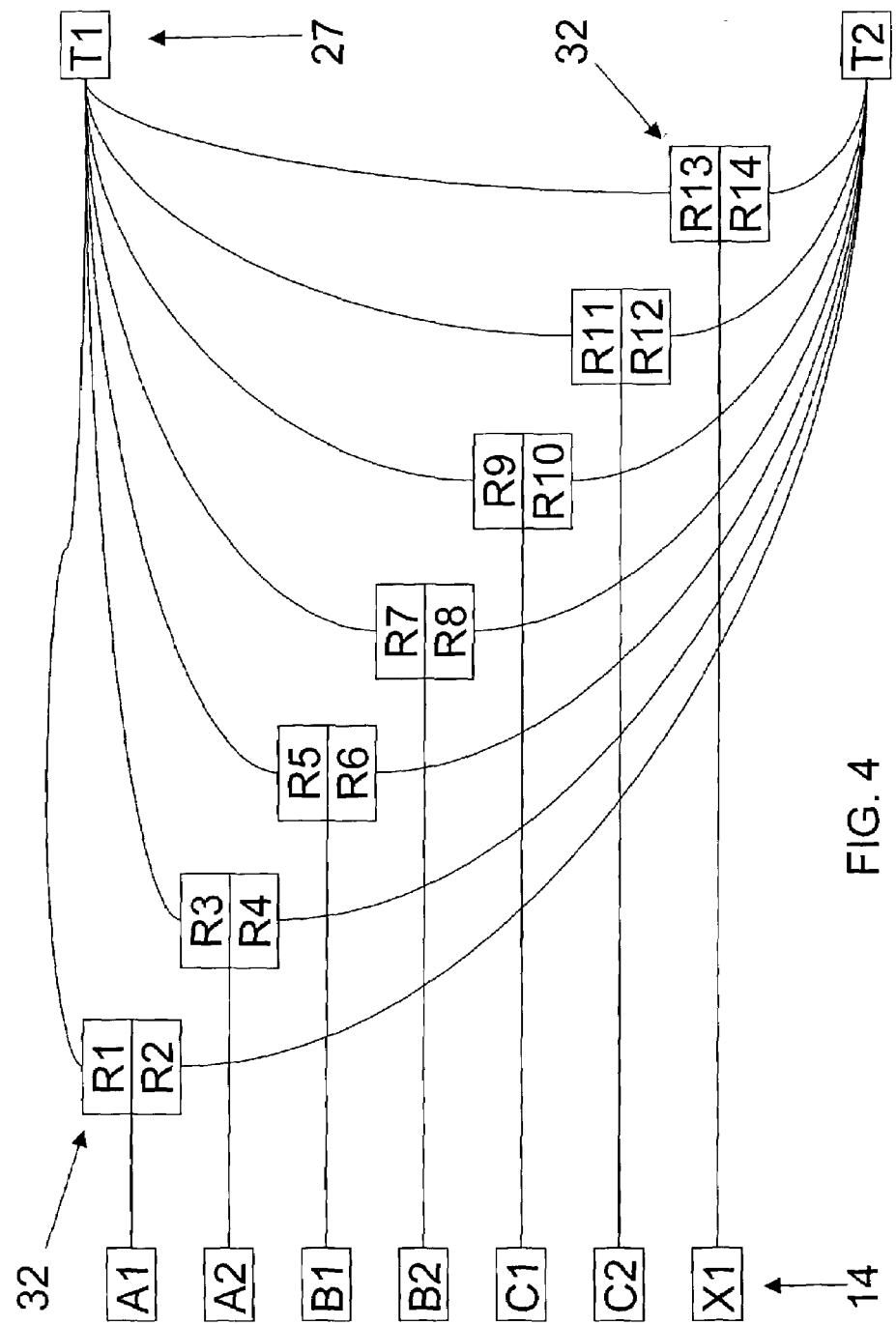
FIG. 4 is a schematic of a switching unit of the tester.
Figure 5:
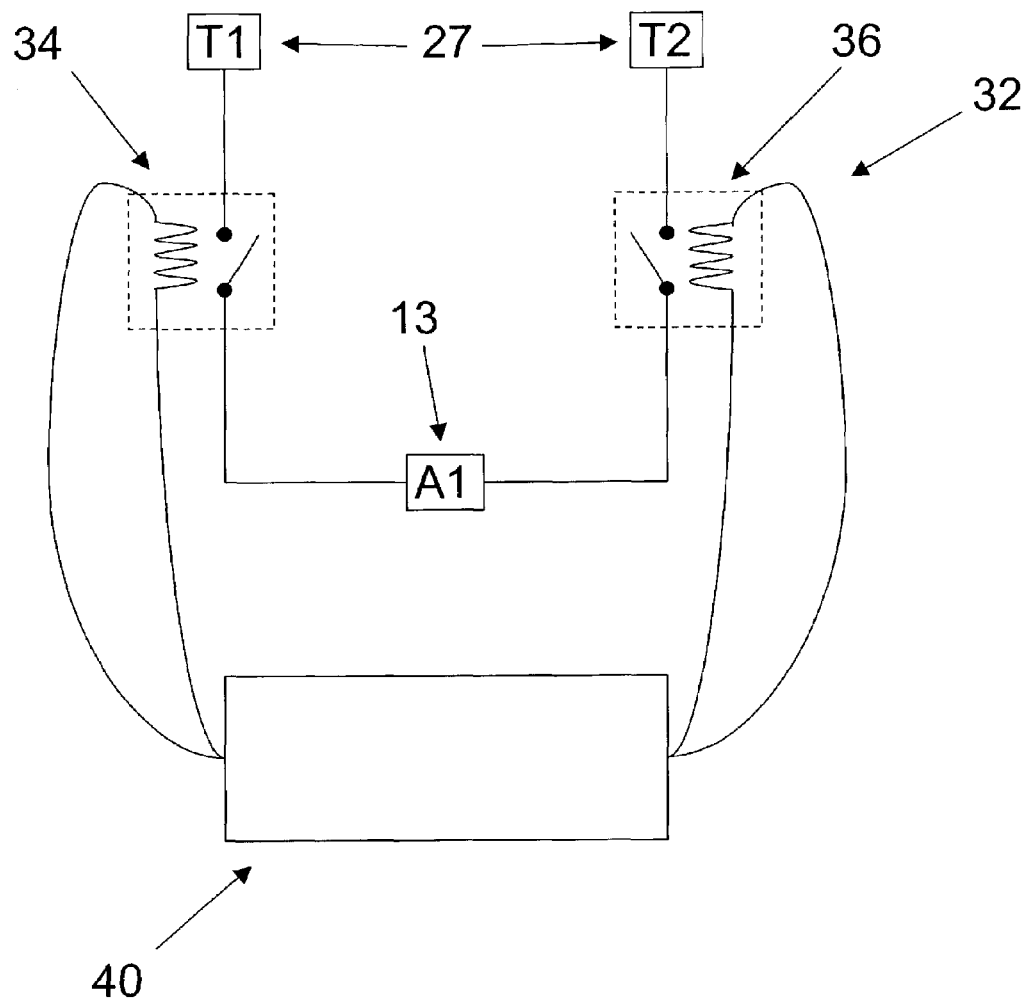
FIG. 5 is a detail schematic of a relay of the switching unit.

Referring also to FIG. 4, the switching unit 20 preferably comprises a pair of single pole single throw relays 32, such as R1, R2, R3, R4, R5, and R6, connected to each termination point 13. Referring also to FIG. 5, a first relay 34 is preferably connected to T1 and a second relay 36 is preferably connected to T2. The relays 32 are preferably controlled by an addressing unit 40 that individually energizes the relays 32 according to digital address words received from the processing unit 18 over an address bus. The address words direct which termination point 13 should be connected to which test point 27, and thus instruct the addressing unit 40 which relays 32 should be energized.

For example, the processing unit 18 may direct the addressing unit 40 of the switching unit 20 to actuate selected relays 32 such that A1 is connected to T1 and B1 is connected to T2. In this case, the addressing unit 40 preferably energizes R1 such that A1 is connected to T1 through the first relay 34. Additionally, the addressing unit 40 preferably energizes R6 such that B1 is connected to T2 through the second relay 36. The addressing unit 40 also preferably de-energizes the remaining relays 32, such that the corresponding termination points 13 are disconnected from the test points 27. With the switching unit 20 configured in this manner, the testing unit 16 can take the resistance measurement between A1 and B1.

Alternatively, the processing unit 18 may direct the switching unit 20 to actuate selected relays 32 such that A1 is connected to T1 and X1 is connected to T2. In this case, the addressing unit 40 preferably energizes R1 such that A1 is connected to T1 through the first relay 34. Additionally, the addressing unit 40 preferably energizes R14 such that X1 is connected to T2 through the second relay 36. The addressing unit 40 also preferably de-energizes the remaining relays 32, such that the corresponding termination points 13 are disconnected from the test points 27. With the switching unit 20 configured in this manner, the testing unit 16 can take the resistance measurement between A1 and X1.

Furthermore, the processing unit 18 may direct the switching unit 20 to actuate selected relays 32 such that X1 is connected to T1 and B1 is connected to T2. In this case, the addressing unit 40 preferably energizes R13 such that X1 is connected to T1 through the first relay 34. Additionally, the addressing unit 40 preferably energizes R6 such that B1 is connected to T2 through the second relay 36. The addressing unit 40 also preferably de-energizes the remaining relays 32, such that the corresponding termination points 13 are disconnected from the test points 27. With the switching unit 20 configured in this manner, the testing unit 16 can take the capacitance measurement across B1 and X1.

As discussed above, the processing unit 18 is preferably programed with the electrical circuit's 12 interconnection information, thereby allowing the processing unit 20 to know which combinations of termination points 13 should result in high and low resistance measurements. Thus, the processing unit 18 compares each resistance measurement to the interconnection information to identify which termination points 13 are in conflict and in what manner the termination points 13 conflict, thereby determining what faults exist in the electrical circuit 12. However, it is typically insufficient for the processing unit 18 to simply determine which termination points 13 are in conflict, since this doesn't effectively inform a service technician where he or she should begin in order to actually locate and fix the faults. Without more information, the technician may be required to spend many hours trying to locate and fix the faults.

In order to help the technician locate and fix the faults, the processing unit 18 is able to use the measurements to determine where each fault is located in the electrical circuit 12. For example, if TB1 is shorted to X1, as shown by the dashed line in FIG. 2, then the testing unit 16 would measure relatively low resistance between any combination of A1, B1, and X1. While the processing unit 18 may expect the resistance measurement to be relatively low between A1 and B1, the resistance measurement between A1 and X1 is expected to be relatively high. Additionally, the resistance measurement between B1 and X1 is also expected to be relatively high. Since the resistance measurements involving X1 are relatively low, then the processing unit 18 determines that there must be a short-circuit fault (SCF) to X1 somewhere between A1 and B1.

The processing unit 18 next identifies where, between A1 and B1, the SCF is located by comparing the corresponding resistance measurements. As an example, suppose the resistance measurement between A1 and B1 is found to be approximately 0.2461 Ohms, the resistance measurement between A1 and X1 is found to be approximately 0.2166 Ohms, and the resistance measurement between B1 and X1 is found to be approximately 0.1085 Ohms. Since the resistance measurement between B1 and X1 is the smallest value, the SCF must be closer to B1 than to A1.

The processing unit 18 can be even more precise by adding the resistance measurement between A1 and X1 to the resistance measurement between B1 and X1 which yields a sum of approximately 0.3251. The sum, in this case, inherently includes the resistance between X1 and the SCF measured twice and the resistance measurement between A1 and B1. It can be seen that, the sum is approximately 0.0790 Ohms greater than the resistance measurement between A1 and B1. Therefore, the resistance between X1 and the SCF is approximately 0.0395 Ohms.

Figure 2:
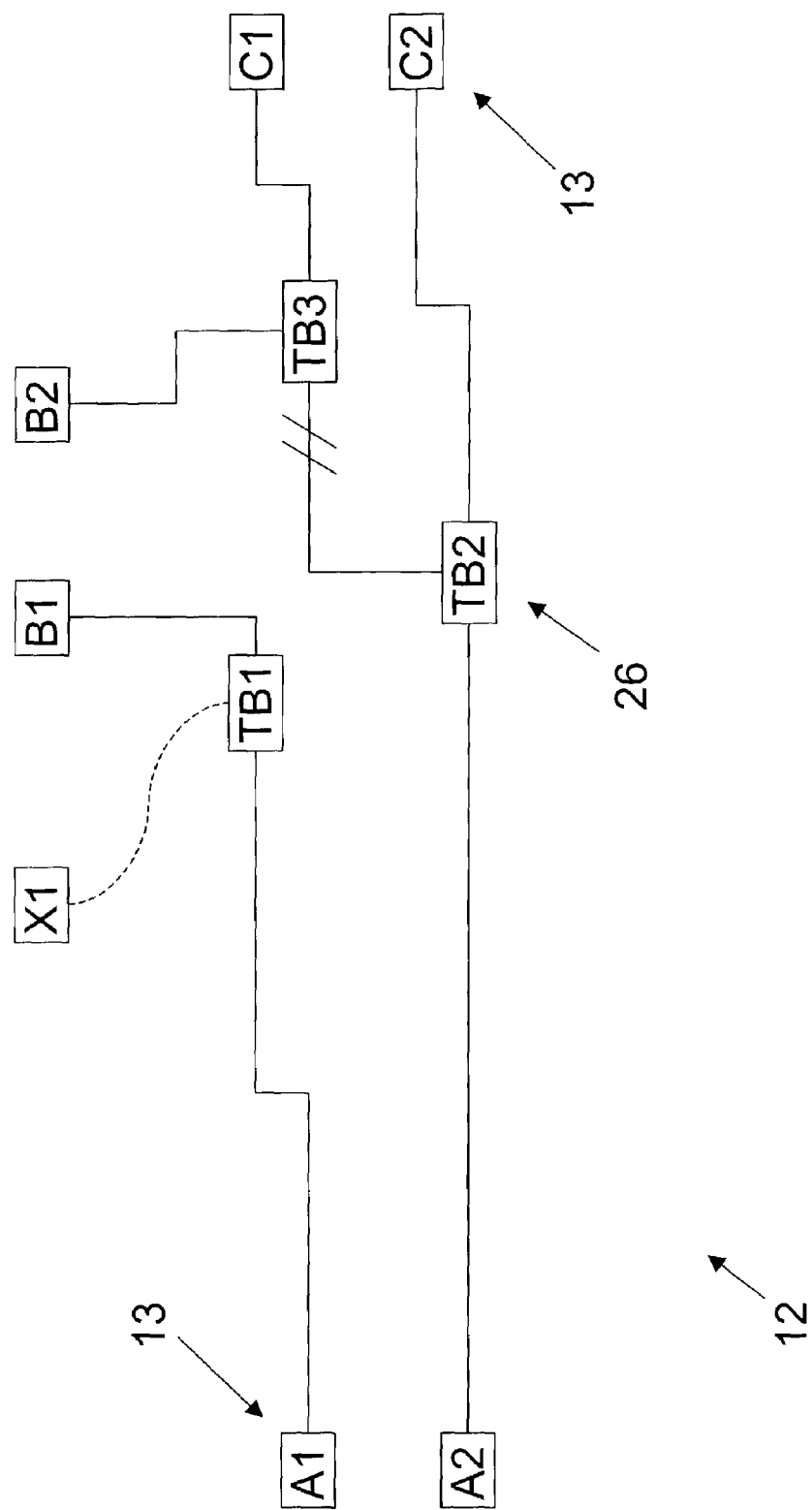
FIG. 2 is a schematic of the electrical circuit showing a simple short-circuit fault and a simple open-circuit fault.

In order to locate the SCF with respect to A1 and B1, the 0.0395 resistance can be subtracted from the resistance measurement between A1 and X1 and the resistance measurement between B1 and X1. In this case, the resistance between A1 and the SCF is approximately 0.1771 Ohms and the resistance between B1 and the SCF is approximately 0.0690 Ohms. The processing unit 18 then calculates a resistance ratio (RR) of approximately 72%, in this case, indicating that the SCF is located approximately 72% of a conductor length (CL) between A1 and B1. As shown in FIG. 2, A1 is interconnected with B1 through TB1 and TB1 is roughly three times as far from A1 as from B1. Thus, in this case, the processing unit 18 preferably indicates that the SCF is located approximately 72% of the CL and near TB1.

To be even more precise, the interconnection information programmed into the processing unit 18 preferably includes details as to electrical characteristics and CLs as well as wire sizes and types used throughout the electrical circuit 12. For example, suppose the CL from A1 to TB1 is supposed to be approximately 151 inches and the CL from B1 to TB1 is supposed to be approximately 59 inches. Applying the RR to a total conductor length (TCL) between A1 and B1 of approximately 210 inches yields that the SCF must be approximately 151 inches from A1 or substantially adjacent TB1. Therefore, the processing unit 18 preferably indicates that the SCF is located substantially adjacent TB1. The processing unit 18 may also indicate the CL to the SCF from A1 and/or B1. In this case, it is anticipated that the technician's first actions will center around examining TB1. Thus, by identifying the location of the fault and nearby items, such as TB1, the tester 10 of the present invention guides the technician directly to the location of the fault.

Additionally, the interconnection information may comprise positional information relating to physical paths of the electrical circuit 12. Using the positional information and the determined location of the fault, the processing unit 18 can determine an actual position of the fault. For example, assuming that the electrical circuit 12 is installed in a vehicle, the processing unit 18 can inform the technician where the fault may be physically found with reference to the vehicle. More specifically, the processing unit 18 may inform the technician that the fault is located behind a specific access panel, within a specific section of conduit, or in a specific junction box, etc.

It should be apparent that finding faults comprises detecting and reporting which termination points 13 are in conflict. Locating faults carries this much further in actually determining and reporting where faults are located along the electrical circuit 12, drastically cutting time that the technician must spend looking for the fault. Finally, positioning faults further advances the art by determining and reporting where faults may be found with reference to their surroundings.

In preferred embodiments, the tester 10 is capable of locating or positioning faults within the electrical circuit 12. However, in alternative embodiments, the tester 10 may not actually locate faults and may be limited to finding faults. Additionally, in still other embodiments, the tester 10 may include very limited, if any, electrical testing capability. Although, it is anticipated that the tester 10 will be most useful if able to fully test both the electrical circuit 12 and the optical circuit 14.

The processing unit 18 locates open-circuit faults by performing calculations on the capacitance measurement. For example, if there is an open-circuit fault (OCF) between TB2 and TB3, as shown by the diagonal lines in FIG. 2, then the testing unit 16 would measure relatively high resistance between either A2 or C2 and either B2 or C1. However, programmed with the interconnection information, the processing unit 18 expects relatively low resistance between any combination of A2, B2, C1, and C2. Additionally, in this case, the resistance measurement between A2 and C2 is also relatively low, as expected. Furthermore, in this case, the resistance measurement between B2 and C1 is relatively low, as expected. Therefore, the processing unit 18 determines that A2 and C2 are both connected to TB2 and B2 and C1 are both connected to TB3, as expected. Thus, the processing unit 18 determines that the OCF is located somewhere between TB2 and TB3.

In order to more accurately locate the OCF, the processing unit 18 next compares the corresponding capacitance measurements with respect to the reference point, such as X1. As an example, suppose the capacitance measurement for A2 is approximately 1247 picoFarads (pF), the capacitance measurement for B2 is approximately 308 pF, the capacitance measurement for C1 is approximately 323 pF, and the capacitance measurement for C2 is approximately 1236 pF. It should be noted that the capacitance measurement for A2 is expected to be substantially identical to the capacitance measurement for C2, since A2 is connected to C2 through the electrical circuit 12. Likewise, the capacitance measurement for B2 is expected to be substantially identical to the capacitance measurement for C1. In the above example, there are slight variations which may occur for any number of reasons, such as repeatability of the voltage sensor 30 and other internal influences. In any case, more accurate results may be obtained by averaging the values expected to be identical. Thus, in this case, an average for the TB2 side of the OCF is approximately 1242 pF and an average for the TB3 side of the OCF is approximately 316 pF. Then, the processing unit 18 calculates a capacitance ratio (CR) of approximately 80%, indicating that the OCF is located approximately 80% of the TCL between A2 to C2 and B2 to C1.

As discussed above, the interconnection information programmed into the processing unit 18 includes details as to CLs as well as wire sizes and types used throughout the electrical circuit 12. Therefore, the processing unit 18 can calculate the TCL or amount of conductive path on each side of the OCF. For example, suppose the CL from A2 to TB2 is approximately 196 inches, suppose the CL from C2 to TB2 is approximately 84 inches, suppose the CL from B2 to TB3 is approximately 38 inches, suppose the CL from C1 to TB3 is approximately 36 inches, and suppose the CL from TB2 to TB3 is approximately 42 inches. In this case, the TCL is approximately 396 inches. Applying the CR, the OCF is located at approximately 317 inches along the TCL between A2 to C2 and B2 to C1. Since the CL from A2 to C2 is approximately 280 inches, the OCF must be approximately 37 inches from TB2 and approximately 5 inches from TB3. In this case, the processing unit 18 preferably indicates that the OCF is approximately 37 inches from TB2 and approximately 5 inches from TB3, leading the technician to first examine TB3.

It is important to note that using only the CL, as described above, assumes that relevant conductors are of sufficiently identical types. Several factors, such as shielding, insulation, wire size, and material, can influence the above described calculations. For example, a larger wire size between A2 and TB2 than between B2 and TB3 may bias the capacitance measurement associated with A2 higher than the capacitance measurement associated with B2. However, the processing unit 18 may compensate for these and other factors using the interconnection information.

In the above examples, the RR and the CR that are calculated by the processing unit 18 may or may not precisely locate the fault. For example, either the RR or the CR may be off by as much as 10%. With simple electrical circuits, such as that shown in FIG. 2, a 10% error may be acceptable and still adequately guide the technician to the fault. However, with more complex or very long electrical circuits, the 10% error may not be acceptable requiring the technician to examine several terminal blocks 26.

The majority of the error experienced by the tester 10 may be due to internal influences caused by manufacturing tolerances of internal components and other factors. Thus, the tester 10 can be even more accurate by compensating for such internal influences. There are at least two internal influence reduction methods (IIRM) that the tester 10 of the present invention may use in compensating for internal influences. A first IIRM involves simply reversing the test points 27 used in calculating the RR and the CR during a first iteration, such as that described above. For example, if the switching unit 20 was directed to connect A1 to T1 and B1 to T2, then the processing unit 18 performs a second iteration directing the switching unit 20 to connect A1 to T2 and B1 to T1. Upon completion of the second iteration, the processing unit 18 preferably averages the RRs and the CRs developed during the first and second iterations. In this manner, the processing unit 18 can minimize at least some of the internal influences of the tester 10.

A second IIRM involves the processing unit 18 subtracting values stored in a tare log, which will be discussed in more detail below, from each measurement taken by the testing unit 16. As will become apparent, this effectively subtracts the internal influences of the tester 10 from the calculations used to develop the RR and the CR. Additionally, the processing unit 18 may develop an extremely accurate RR and CR by using a combination of both the first IIRM and the second IIRM.

The tare log is developed during calibration of the tester 10 and effectively stores internal characteristics of the tester 10. These internal characteristics, such as an internal resistance and an internal capacitance, contribute to the internal influences described above. For example, a total ratio of the resistance measurement between A1 and X1 to the resistance measurement between B1 and X1 is approximately 67%. It can be seen that, the total ratio differs from the RR by 5% of the TCL, which is directly related to the influences of the resistance between X1 and the SCF. The internal characteristics of the tester 10 may effect the RR and the CR in a similar manner. Thus, the processing unit 18 preferably subtracts the internal resistance and the internal capacitance of the tester 10 as described above as was done for the resistance between X1 and the SCF.

The internal resistance is preferably determined by first shorting the switching unit 20 where the electrical circuit 12 or the harness 24 would normally be connected. Then, the processing unit 18 directs the switching unit 20 to cycle through every possible combination of termination points 13, while the testing unit 16 takes the resistance measurements. The processing unit 18 logs each resistance measurement in the tare log for each combination of termination points 13, thereby identifying the internal resistance of the tester 10 without the harness 24.

Additionally, the harness 24 may be connected to the switching unit 20 and shorted at the circuit end where the electrical circuit 12 would normally be connected. Then, the processing unit 18 again directs the switching unit 20 to cycle through every possible combination of termination points 14, while the testing unit 16 takes the resistance measurements. The processing unit 18 again logs each resistance measurement in the tare log for each combination of termination points 13, thereby identifying the internal resistance of the tester 10 with the harness 24.

Alternatively, the internal resistance of the harness 24 may be calculated. For example, individual internal resistances for each conductor of the harness 24 can be calculated based on length, cross-section, and material for each conductor. Each individual internal resistance may be stored in the tare log and added to the internal resistance for the corresponding combination of termination points 13.

Similarly, the internal capacitance is preferably determined with the electrical harness 24 connected to the switching unit 20 but disconnected from the electrical circuit 12. The processing unit 18 then directs the switching unit 20 to cycle through every possible combination of termination points 13, while the testing unit 16 takes the capacitance measurements. The processing unit 18 logs each capacitance measurement in the tare log for each combination of termination points 13, thereby identifying the internal capacitance of the tester 10 with the electrical harness 24. Additionally, or where the electrical harness 24 is not used, the switching unit 20 itself may be left disconnected from both the electrical harness 24 and the electrical circuit 12. In this case, the processing unit 18 logs each capacitance measurement in the tare log for each combination of termination points 13, thereby identifying the internal capacitance of the tester 10 without the electrical harness 24. It is important to note that where the electrical harness 24 is used, the tare log preferably contains the internal characteristics of the tester 10 both with and without the electrical harness 24.

The processing unit 18 can not only improve the accuracy of the RR and the CR, as described above, but may even locate faults within the tester 10 itself, using the internal characteristics stored in the tare log. For example, if the internal resistance of the tester 10 with the electrical harness 24 is greater than the resistance measurement calculated during testing of the electrical circuit 12, then the SCF must be located somewhere within the tester 10 or the electrical harness 24. The processing unit 18 may also determine more precisely where the SCF is located using the internal resistance associated of the tester 10 without the electrical harness 24. For example, if the resistance measurement calculated during testing of the electrical circuit 12 is between the internal resistance of the tester 10 with and without the electrical harness 24, then the SCF must be located within the electrical harness 24 and may be referred to as a harness fault. Alternatively, if the resistance measurement calculated during testing of the electrical circuit 12 is less than the internal resistance of the tester 10 without the electrical harness 24, then the SCF must be located within the tester 10 itself and may be referred to as a tester fault. It is important to note that the processing unit 18 may locate both SCFs and OCFs within tester 10 itself and/or the electrical harness 24. As such, the harness faults and the tester faults may be either SCFs or OCFs.

It can be seen that the tester 10 uses percentages and ratios in locating the faults. This allows the processing unit 18 to disregard environmental concerns, such as temperature effects on the wire bundle 12, since the concerns will effect the tester 10, the electrical circuit 12, and the electrical harness 24, thereby biasing all measurements in a similar manner. Thus, using ratios effectively negates any errors environmental concerns may otherwise induce.

The interconnection information also preferably includes details as to what electrical elements are included in the electrical circuit 12, where those elements are located, and what characteristics those elements posses. Thus, the processing unit 18 can bias the calculations used to develop the RR and the CR by the characteristics of the elements. Similarly, as discussed above, the processing unit 18 can bias the calculations used to develop the RR and the CR by the different wire sizes that may exist in the electrical circuit 12. For example, if the wire between A2 and TB2 is larger that the wire between TB2 and C2, then the resistance between A2 and TB2 may actually be lower than the resistance between TB2 and C2. Thus, the processing unit 18 may bias the RR calculations, such as through dividing the resistance measurement by a cross-sectional area of the wire or multiplying by a gauge size.

Figure 6:
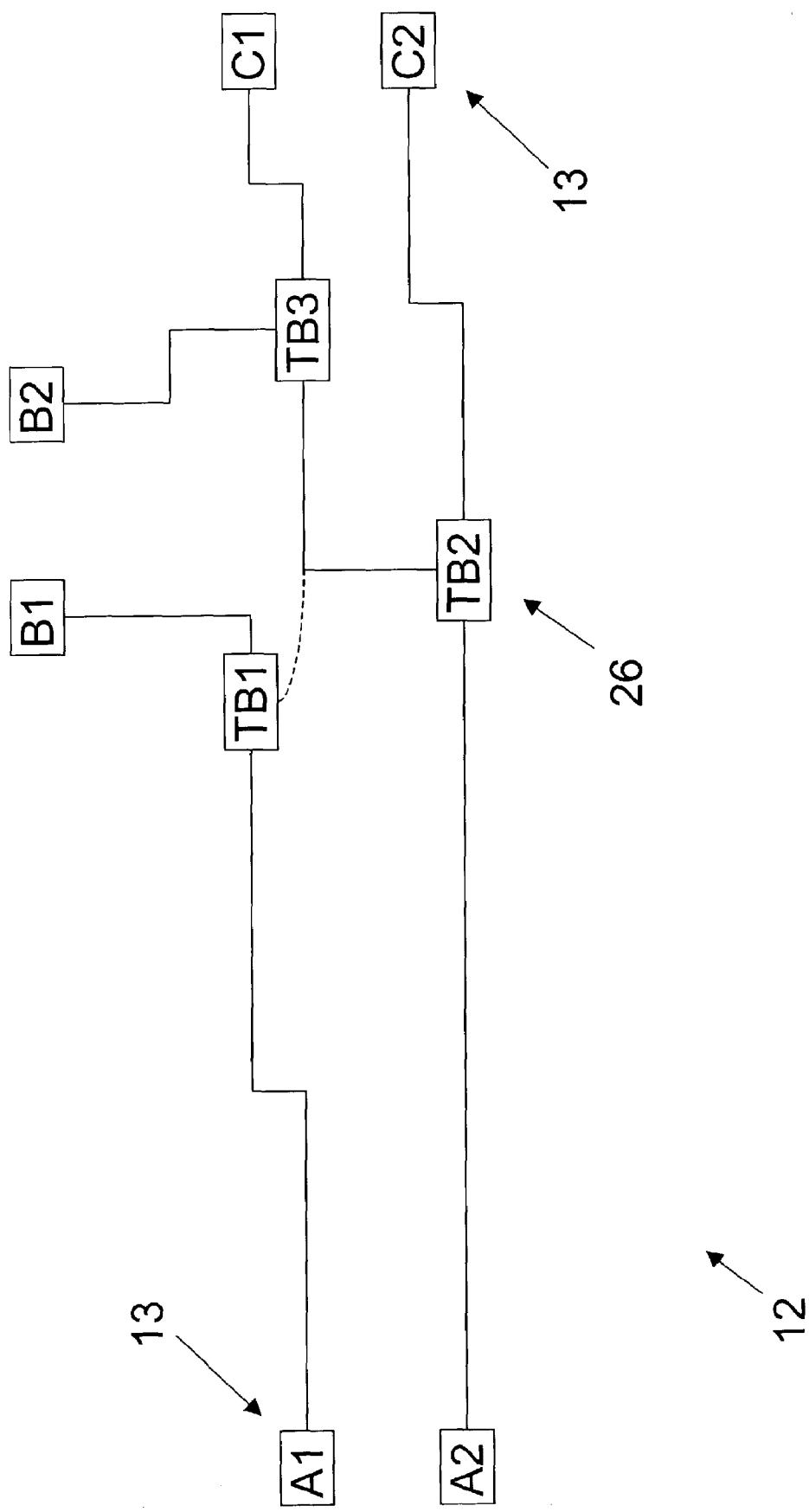
FIG. 6 is a schematic of the electrical circuit showing a more complex short-circuit fault.

As discussed above, while FIG. 2 shows a relatively simple example of the electrical circuit 12, the tester 10 is expected to be used with much more complex examples of the electrical circuit 12. Referring also to FIG. 6, in an effort to illustrate a more complex example of the electrical circuit 12, suppose TB1 is shorted to somewhere between TB2 and TB3, as shown by the dashed line. In this case, the testing unit 16 would measure relatively low resistance between any combination of the termination points 13 and manually locating the SCF may be an extremely difficult matter for the technician. However, the tester 10 simply utilizes the procedures described above, allowing the processing unit 18 to accurately locate virtually any fault regardless of the complexity of the electrical circuit 12. For example, Table 1 shows exemplary resistance measurements that may be taken by the testing unit 16, in examining the electrical circuit 12 of FIG. 6. Notice that some of the CLs are unknown, since those termination points 13 are not supposed to be connected.

TABLE 1

Resistance Measurements Associated with FIG. 6

| Points | CL (inches) | Resistance (Ohms) |
| --- | --- | --- |
| A1 to A2 | — | 0.4418 |
| A1 to B1 | 210 | 0.2461 |
| A1 to B2 | — | 0.2590 |
| A1 to C1 | — | 0.2566 |
| A1 to C2 | — | 0.3106 |
| A2 to B1 | — | 0.3340 |
| A2 to B2 | 276 | 0.3234 |
| A2 to C1 | 274 | 0.3211 |
| A2 to C2 | 280 | 0.3281 |
| B1 to B2 | — | 0.1512 |
| B1 to C1 | — | 0.1488 |
| B1 to C2 | — | 0.2027 |
| B2 to C1 | 74 | 0.0867 |
| B2 to C2 | 164 | 0.1922 |
| C1 to C2 | 162 | 0.1898 |

However, using the procedures described above, the tester 10 can take and utilize measurements for each possible combination of termination points 13. For example, adding the resistance measurement between A1 and B2 to the resistance measurement between B1 and B2 yields a sum of approximately 0.4102. The sum, in this case, inherently includes the resistance between B2 and the SCF measured twice and the resistance measurement between A1 and B1. It can be seen that, the sum is approximately 0.1641 Ohms greater than the resistance measurement between A1 and B1. Therefore, the resistance between B2 and the SCF is approximately 0.0820 Ohms. In this case it is important to note that the 0.0820 Ohm resistance also includes any resistance due to the short itself. Regardless, it follows that the resistance between A1 and the SCF is approximately 0.1770 Ohms and the resistance between B1 and the SCF is approximately 0.0692 Ohms. In this case, as in the first example, the processing unit 18 calculates the resistance ratio (RR) to be approximately 72%, indicating that the SCF is located approximately 72% of the CL between A1 and B1 or substantially adjacent TB1. This gives us a first conflicting location of the SCF which can be verified comparing A1 and B1 with C1 or C2, in the same manner as was done with B2.

In order to find a second conflicting location of the SCF, we must examine the electrical circuit 12 from an opposing perspective. For example, adding the resistance measurement between A1 and A2 to the resistance measurement between A1 and B2 yields a sum of approximately 0.7008. The sum, in this case, inherently includes the resistance between A1 and the SCF measured twice and the resistance measurement between A2 and B2. It can be seen that, the sum is approximately 0.3774 Ohms greater than the resistance measurement between A2 and B2. Therefore, the resistance between A1 and the SCF is approximately 0.1887 Ohms. In this case it is important to note that the 0.1887 Ohm resistance also includes any resistance due to the short itself. Regardless, it follows that the resistance between A2 and the SCF is approximately 0.2531 Ohms and the resistance between B2 and the SCF is approximately 0.0703 Ohms. In this case, the processing unit 18 calculates the RR to be approximately 78%, indicating that the SCF is located approximately 78% of the CL between A2 and B2.

According to the interconnection information, the TCL between A2 and B2 is supposed to be approximately 276 inches, with 196 inches of that between A2 and TB2, 42 inches of that between TB2 and TB3, and 38 inches of that between TB3 and B2. Applying the RR, the SCF is approximately 215 inches from A2 and approximately 19 inches from TB2. Thus, the SCF must be approximately 23 inches from TB3. In this manner, the processing unit 18 can accurately locate faults even in complex electrical circuits.

It is important to note that if A2 and C2 or B2 and C1 were used instead of A2 and B2, in the above example, the processing unit 18 would have been able to identify that the SCF was generally located between TB2 and TB3. The processing unit 18 would then select other termination points 14 that are connected together on either side of the SCF in order to more accurately locate the SCF. For example, A2 and C1, B2 and C2, or C1 and C2 could have been used instead of A2 and B2 to find the second location of the SCF. Additionally, any of the four combinations, A2 and B2, A2 and C1, B2 and C2, or C1 and C2 can be used to verify the RR calculated using one of the four combinations. Furthermore, all four combinations may be used with the resulting RRs being averaged to calculate a very precise RR. In any case, the processing unit 18 preferably indicates all elements adjacent to the SCF.

As discussed above, in alternative embodiments, the tester 10 may not actually locate or position electrical faults. For example, the tester 10 may only find faults. Furthermore, while some form of electrical testing is preferred, electrical testing is not required. As such, in still other alternative embodiments, the tester 10 may not include any electrical testing capability.

The operation of the tester 10 has been described above as primarily performing continuity type testing, by testing pairs of the termination points 13. However, the tester 10 may also perform isolation type testing. For example, the tester 10 may actuate the first relay 34 associated with A1 and the remaining second relays 36, such as those associated with A1, A2, B1, B2, C1, and C2. In this case, X1 would be connected to T1 and the remaining termination points 13 would be connected to T2. In this manner, the tester 10 can test isolation between X1 and the remaining termination points 13.

Fiber Optical Testing

Figure 7:
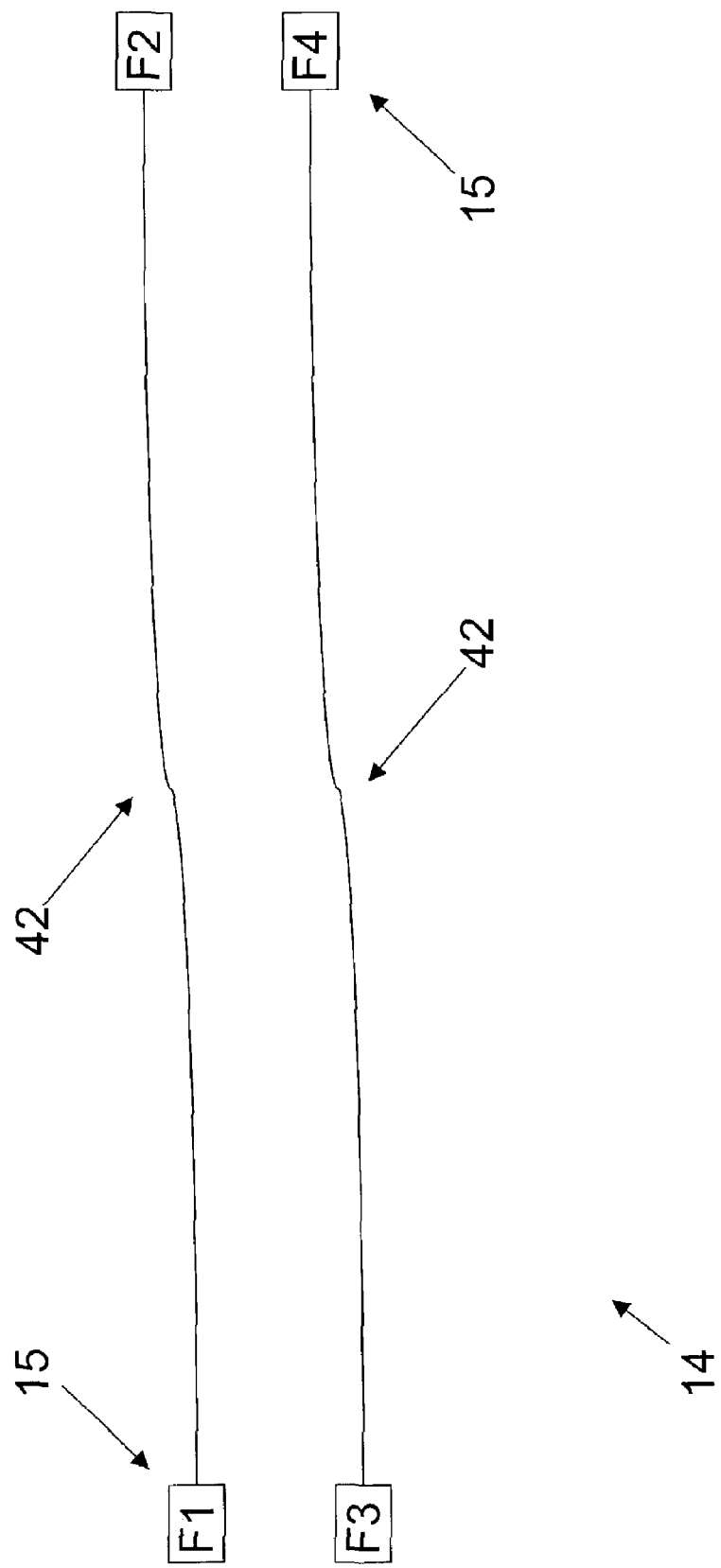
FIG. 7 is a schematic of the optical circuit.

Referring to FIGS. 1 and 7, the fiber unit 22 preferably allows the tester 10 to perform a light attenuation measurement on each of a plurality of fiber strands 42 within the optical circuit 14. The attenuation measurement is similar to the resistance measurement described above. Each fiber strand 42 is preferably 100/140 micron multi-mode fiber selected to guide light having an approximately 850 nanometer (nm) wavelength. Specifically, the fiber strands 42 preferably have approximately 100 micrometer (um) diameter cores surrounded by cladding having an approximately 140 um external diameter. However, the fiber unit 22 may be designed for use with other commonly used multi-mode fiber stands, such as 50/125 micron fiber, 62.5/125 micron fiber, and 110/125 micron fiber. Furthermore, the fiber unit 22 may be designed for use with commonly used single-mode fiber strands, such as 9/125 micron fiber. Finally, the optical circuit 14 may include common optical elements, such as couplers, splitters, and switches.

Each fiber strand 42 preferably includes two termination points 15, such as F1, F2, F3, and F4, with one of those termination points 15 on either end of the optical circuit 14. Thus, it can be seen that the optical circuit 14 is preferably simpler than the electrical circuit 12 described above. For example, each termination point 15 of the optical circuit 14 is preferably connected through one fiber strand 42 to one other termination point 15. Conversely, as discussed above, the electrical circuit 12 is expected to include termination points 13 that may be connected to two or more other termination points 13. Thus, the interconnection information associated with the optical circuit 14 is also expected to be simpler than that associated with the electrical circuit 12. For example, the interconnection information associated with the optical circuit 14 is expected to include information as to which pairs of termination points 15 are expected to be interconnected. The interconnection information associated with the optical circuit 14 may also include information as to sizes, types, and lengths of the fiber strands 42.

Figure 8:
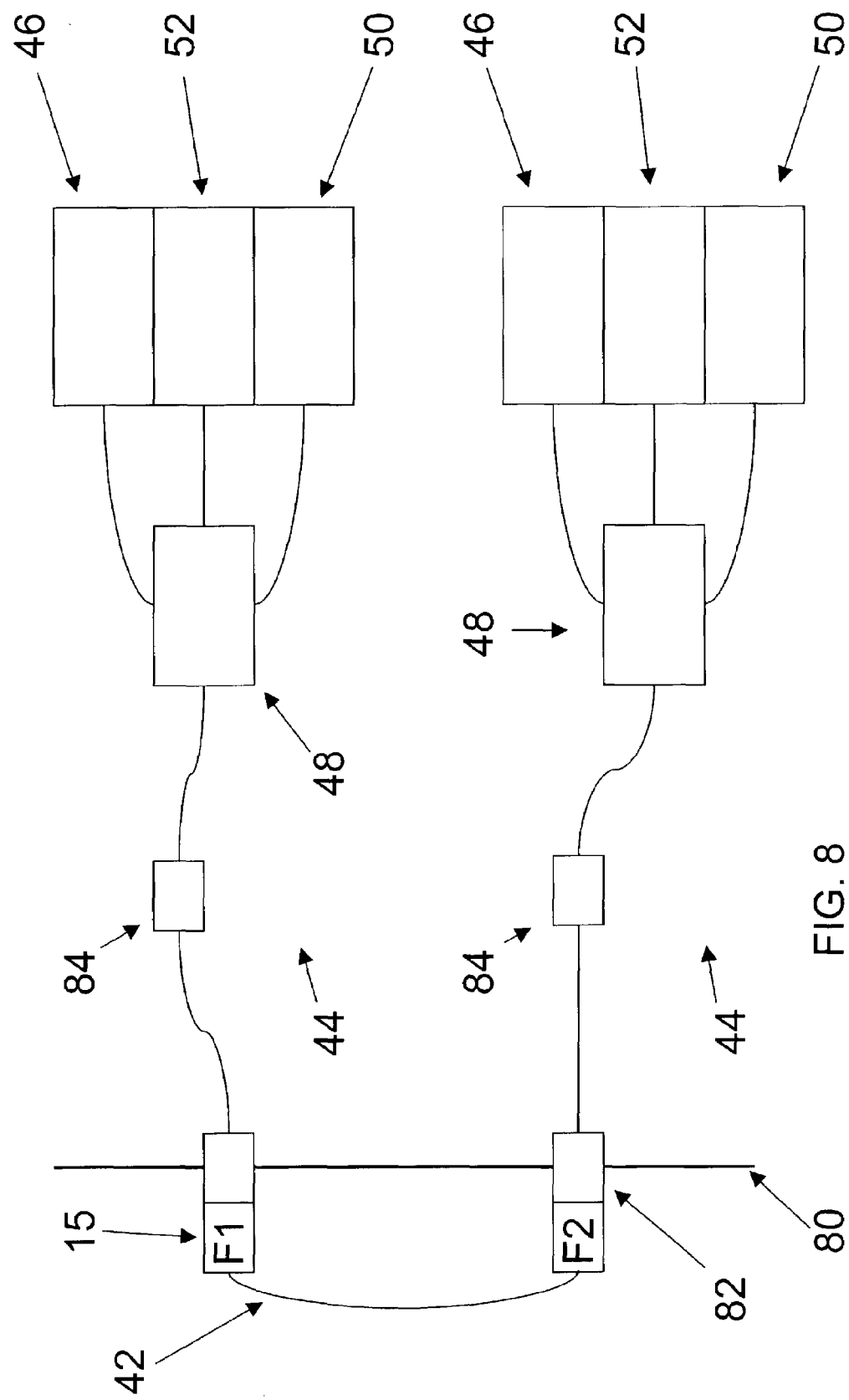
FIG. 8 is a schematic fiber unit of the tester.
Figure 9:
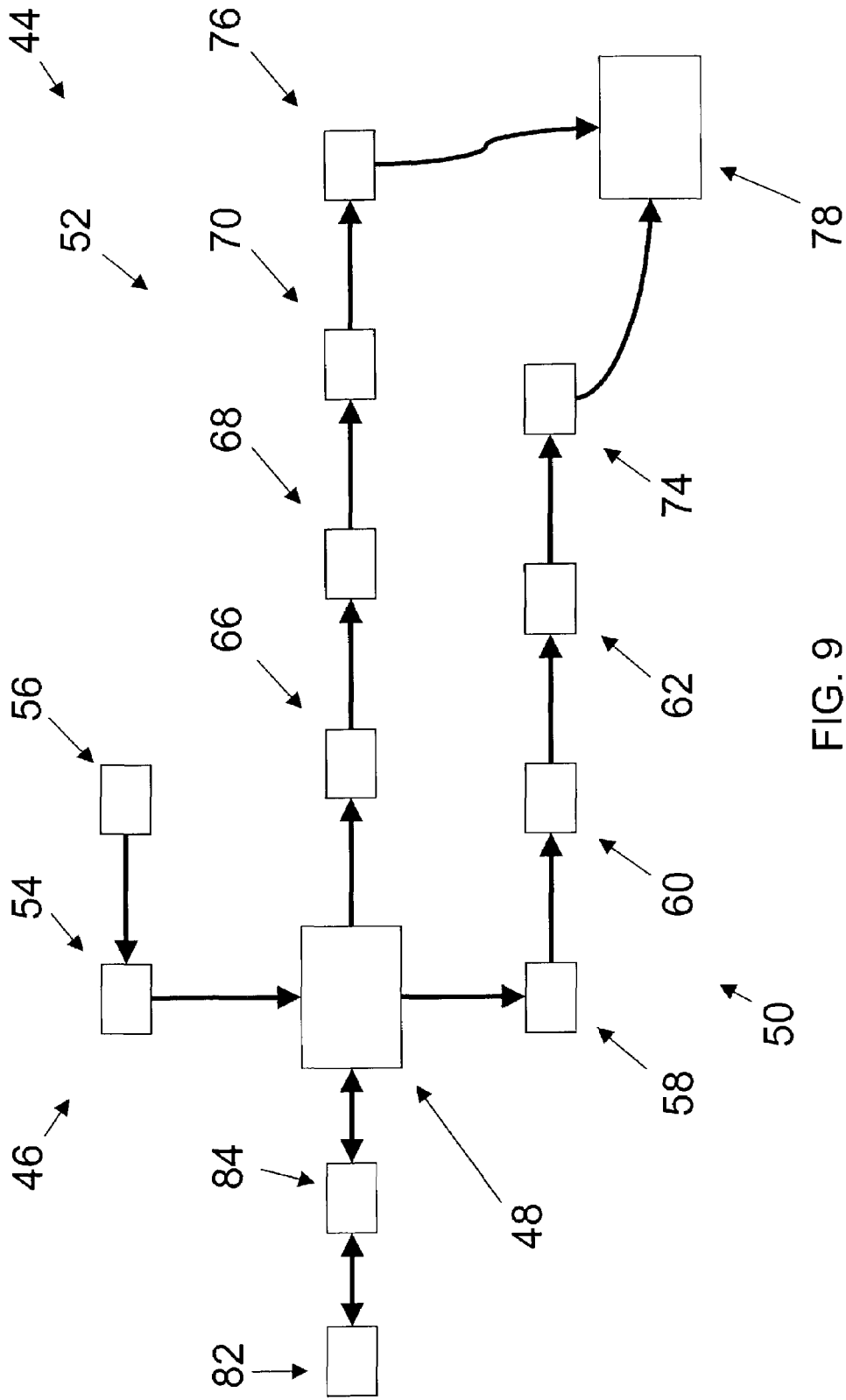
FIG. 9 is a detail schematic of a light port of the fiber unit.

Referring also to FIG. 8, the fiber unit 22 is designed to individually test each fiber strand 42. Therefore, in a preferred embodiment, the fiber unit 22 comprises a plurality of fiber optic light ports 44, with at least one light port for each termination point of the optical circuit. For example, if the optical circuit 14 comprises twelve fiber strands each having two termination points 15, the fiber unit 22 preferably comprises at least twenty-four light ports 44. Each light port 44 preferably comprises a light transmitter 46 to transmit light into one of the fiber strands 42 through an optical coupler 48, a light monitor 50 to monitor the light from the light transmitter 46 through the coupler 48, and a light receiver 52 to receive light from the light transmitter 46 through one of the fiber strands 42. Referring also to FIG. 9, the light transmitter 46 preferably comprises a light emitting diode (LED) 54 powered by a constant current source 56. More specifically, the LED 54 preferably transmits light at a known transmitted power level (PT) with an approximately 850 nm wavelength.

The coupler 48 preferably divides the light transmitted by the light transmitter 46 into two equal halves, such as a fiber power (PF) and a monitor power (PM). Thus, the coupler 48 is preferably a 50/50 coupler. More specifically, the coupler 48 preferably directs substantially half of the light, PF, to one of the termination points 15 of the optical circuit 14 and substantially half of the light, PM, to the light monitor 50. It can be seen that PF added to PM substantially equals PT and that PF preferably substantially equals PM. The coupler 48 also preferably divides the light received from one of the fiber strands 42 into two equal haves, such as a receiver power (PR) and a waste power (PW). It should be noted the PW is preferably directed toward the transmitter 46 and has virtually no significance.

Alternatively, the coupler 48 may divide the light transmitted by the light transmitter 46 into another ratio. For example, the coupler 48 may be a 67/33 coupler. In this case, the coupler 48 would direct approximately 67% or two thirds of the light to one of the termination points 15 of the optical circuit 14 and approximately 33% or one third of the light to the light monitor 50. It should be obvious that other ratios may be used.

It can be seen that the coupler 48 allows the tester 10 of the present invention to transmit and receive light with each light port 44 through each fiber strand 42. Therefore, using the coupler 48, the tester 10 may test each fiber strand 42 in both directions, without any form of fiber switching or reversing of connectors. In fact, all fiber components are preferably solid-state resulting in a durable and rugged tester that can be moved around in a production environment and still be relied upon to make accurate, stable, and repeatable attenuation measurements.

However, in an alternative embodiment, the fiber unit 22 may incorporate as few as two light ports 44. In this case, the fiber unit 22 preferably includes an optical switch similar in function to the switching unit 20 described above. The optical switch facilitates connecting the light ports 44 to each of the termination points 15 of the optical circuit 14. The optical switch preferably comprises a single pole multi-throw optical relay connected to each coupler 48. Each optical relay is preferably connected to one of the couplers 48 such that each coupler 48 may be connected to any one the termination points 15 of the optical circuit 14. Thus, the optical switch may optically connect each fiber strand 42 between two light ports 44.

The light monitor 50 preferably comprises a monitor photo diode 58 and a monitor operational amplifier 60 that operate together to generate a monitor signal in response to PM. The monitor diode 58 preferably alters internal electrical characteristics in response to PM and the monitor operational amplifier 60 preferably detects such altered characteristics to produce the monitor signal representative of PM. The light monitor 50 preferably also includes a monitor logarithmic amplifier 62 that amplifies the monitor signal to produce a monitor voltage (VM), which is preferably logarithmically proportional to PM, or the light received from the light transmitter 46 through the coupler 48.

The light receiver 52 is preferably similar to the light monitor 50 and comprises a receiver photo diode 66 and a receiver operational amplifier 68 that operate together to generate a receiver signal in response to PR. The receiver diode 66 preferably alters internal electrical characteristics in response to PR and the receiver operational amplifier 68 preferably detects such altered characteristics to produce the receiver signal representative of PR. The light receiver 52 preferably also includes a receiver logarithmic amplifier 70 that amplifies the receiver signal to produce a receiver voltage (VR), which is preferably logarithmically proportional to PR, or the light received from the fiber strand 42 through the coupler 48.

As discussed above, two light ports 44 are preferably used to test each fiber strand 42. For example, the light transmitter 46 of a first light port is preferably used to transmit the light into one of the fiber strands 42, with the light monitor 50 of the first light port monitoring that light transmitter 46. At the same time, the light receiver 52 of a second light port is preferably used to receive light from that fiber strand 42. Thus, the light monitor 50 detects how much light is transmitted into that fiber strand 42 while the light receiver 52 detects how much light is received from that fiber strand 42.

The light monitor 50 and the light receiver 52 are preferably connected to a monitor differential amplifier 74 and a receiver differential amplifier 76, respectively. The differential amplifiers 74, 76 preferably amplify VM and VR with respect to a reference ground bus. The differential amplifiers 74, 76 are preferably connected to an analog bus switch 78 that provides functionality similar to the switching unit 20 described above. The analog bus switch 78 preferably connects either the monitor differential amplifier 74 or the receiver differential amplifier 76 to one of the test points 27 of the testing unit 16 according to instructions received by the processing unit 18. For example, with T1 connected to one of the monitor differential amplifiers 74 and T2 connected to one of the receiver differential amplifiers 76 through the analog bus switch 78, the voltage sensor 30 can take the voltage measurement between VM and VR for one of the fiber strands 42.

It should be obvious that PR is substantially half of PF minus any attenuation loss in that fiber strand 42. Since PM substantially equals PF, PR is expected to be substantially half of PM minus the attenuation loss in that fiber strand 42. As discussed above, VM is preferably proportional to PM and VR is preferably proportional to PR. Additionally, the receiver amplifier preferably amplifies VR such that VR is expected to be substantially equal to VM minus the attenuation loss in that fiber strand 42. Thus, the voltage measurement between VM and VR is indicative of the attenuation loss in that fiber strand.

The processing unit 18 preferably converts the voltage measurement into a power loss expressed in decibels (dB). For example, if the fiber unit 22 is designed to measure 0 dB to 10 dB, then the processing unit 18 may be programmed to equate an approximately 50 millivolt (mV) voltage measurement with 1 dB. The processing unit 18 preferably indicates the attenuation measurement for each fiber strand 42. Additionally, if an attenuation measurement exceeds a programmed attenuation limit, the processing unit 18 also preferably indicates that the associated fiber strand 42 has failed. For example, the tester 10 may take attenuation measurements of a specific fiber strand in first and second directions. If the technician has specified approximately 4 dB as the attenuation limit and the attenuation measurement is approximately 3.8 dB in the first direction and approximately 4.1 dB in the second direction, then the processing unit 18 preferably indicates both attenuation measurements and that the specific fiber strand has failed.

As discussed above, each light port 44 preferably directs PF toward one of the termination points 15 and receives PR from one of the termination points 15 of the optical circuit 14. While the light ports 44 may be connected directly to the termination points 15, the light ports 44 are preferably enclosed within a protective body of the tester 10, and thus not accessible without removing an access panel 80 of the body. Therefore, the termination points 15 of the optical circuit 14 are preferably connected to the access panel 80 using interface connectors 82. The interface connectors 82 are preferably selected specifically to mate with the termination points 15 of the optical circuit 14 and may be any combination of commonly used connectors, such as FC, FDDI, LC, MT Array, SC, SC Duplex, and ST. Alternatively, the optical harness may mate with the interface connectors 82 and include specially adapted connectors to mate with the optical circuit 14.

Additionally, the couplers 48 of the light ports 44 are preferably connected to the interface connectors 82 through patch cords with high quality ST connectors. The patch cords are preferably constructed from a graded-index fiber that has a substantially parabolic refractive index profile and an approximately 0.29 numerical aperture (NA). The parabolic refractive index functions to redirect the light back toward a center of the graded-index fiber's core, in an effort to reduce multi-mode distortion. Similarly, the light transmitters 46, the light monitors 50, and the light receivers 52 are preferably individually connected to the couplers 48 through step-index fibers that have an approximately 0.29 NA.

The fiber unit 22 is preferably designed to use narrowly filled launch characteristics (NFLC) that focus the light toward the center of the fiber strands according to a launch condition standard, such as an AS-100 specification which is currently a proposed specification. NFLC minimizes the effects of variations and imperfections in the connectors and provides more consistent and repeatable attenuation measurements. However, the fiber unit 22 may be designed to use fully filled launch characteristics (FFLC) that more evenly distributes the light across the NA of the fiber strands, which tends to accentuate the effects of variations and imperfections in the connectors. Additionally, the fiber unit 22 may be designed to use other launch characteristics, as specified for a particular application.

In order to accomplish the launch characteristics, each light port 44 may include a launch filter 84. While the filter 84 is preferably connected between the coupler 48 and the interface connector 82, the filter 84 may be connected between the light transmitter 46 and the coupler 48. The filter 84 preferably comprises a graded-index fiber fused to a step-index fiber combined with a mode scrambler. The mode scrambler is preferably a set of equally spaced pins through which a filter fiber is woven producing uniform and opposing bends in the filter fiber. The pins are set to a particular spacing derived from the fiber strand's size to provide appropriate micro-bending, and thus uniform power distribution. However, the mode scrambler may be any other device that provides a specified power distribution.

As discussed above, the tare log is developed during calibration of the tester 10 and stores internal characteristics of the tester 10. The internal characteristics may include attenuation characteristics of the fiber unit 22. Thus, the processing unit 18 can compensate for internal characteristics of the fiber unit 22, as well as other internal influences of the tester 10, as described above.

Furthermore, the tare log can store interface characteristics. For example, if the fiber unit 22 is used with a differently sized fiber strands, such as 62.5/125 micron fiber, the interface connectors 82 may induce attenuation loss and drastically influence the attenuation measurements. Such influences may lead the processing unit 18 to erroneously determining that the fiber strand 42 failed, since the attenuation measurement is likely to exceed the attenuation limit. However, the fiber unit 22 can be calibrated with the differently sized fiber strands, thereby including the attenuation loss at the interface connectors 82 in the tare log. Thus, while the processing unit 18 compensates for the internal characteristic, the processing unit 18 also compensates for the attenuation loss at the interface connectors 82.

SUMMATION

As discussed above, the processing unit 18 indicates faults, fault locations, fault positions, and whether each portion of the circuits 12, 14 pass or fail tests performed by the tester 10. It is important to note that these indications are preferably given in two forms. First, the processing unit 18 preferably indicates these results on an electronic display, such as a computer monitor. Second, the processing unit 18 preferably generates a report including text and/or graphics, which may be dumped to a file or printed through a printer.

The processing unit 18 of the tester 10 is preferably controlled and monitored through a user interface program. The program preferably allows the technician to view and print the report detailing the measurements taken from the circuits 12, 14. Additionally, the program may allow the technician to provide the interconnection information. Furthermore, the program may allow the technician to specify the manner in which the processing unit 18 tests the circuits 12, 14.

While the tester 10 of the present invention may be entirely housed with the body, some components, such as the switching unit 20 may be located outside the body. Additionally, each component of the tester 10 may have its own protective body. For example, the processing unit 18 may be housed in a first protective body and the fiber unit 22 or a portion of the switching unit 20 may be housed in a second protective body. In this manner, individual components of the tester 10 may be located at substantial distances from other components and may communicate over cabling.

As discussed above, the tester 10 may be directly connected to the circuits 12, 14 or may be connected to the circuits 12, 14 through the electrical harness 24 and the optical harness. Additionally, the tester 10 may be connected to the circuits 12, 14 through other adapter forms, such as adapter plates and custom designed connectors.

While the present invention has been described above, it is understood that substitutions can be made. For example, the electrical circuit 12 may actually be two or more simple conductors. Additionally, the optical circuit 14 may actually be one or more fiber strands. While such circuits 12, 14 may not normally warrant such an advanced tester, certain characteristic, such as being extremely long, being buried, or otherwise difficult to access, may require use of the tester 10. Furthermore, the switching unit 20 may incorporate single pole double throw electromechanical switches instead of the pairs of relays 32. These and other minor modifications are within the scope of the present invention.

Having thus described a preferred embodiment of the invention, what is claimed as new and desired to be protected by Letters Patent includes the following:

What is claimed is:

1. A fiber optic tester operable to test an optical circuit having a plurality of termination points, the tester comprising:
   a plurality of light ports operable to transmit and receive light, each light port comprising
      a light transmitter operable to transmit the light,
      a light receiver operable to receive and convert the light into a receiver voltage,
      a light monitor operable to receive and convert the light into a monitor voltage, and
      a coupler operable to split the light transmitted from the light transmitter between the light monitor and one of the termination points;
   a testing unit operable to measure a differential voltage between the receiver voltage and the monitor voltage;
   a processing unit operable to analyze differences between the receiver voltage and the monitor voltage; and
   an analog bus switch operable to connect each light receiver and each light monitor to the testing unit in a sequence controlled by the processing unit.

2. The tester as set forth in claim 1, wherein each light port further includes a receiver amplifier connected between the light receiver and the analog bus switch and operable to amplify the receiver voltage.

3. The tester as set forth in claim 1, wherein each light port further includes a monitor amplifier connected between the light monitor and the analog bus switch and operable to amplify the monitor voltage.

4. The tester as set forth in claim 1, wherein each light port further includes a receiver amplifier operable to amplify the receiver voltage, a monitor amplifier operable to amplify the monitor voltage, and an analog bus switch operable to connect each receiver amplifier and each monitor amplifier to the testing unit in a sequence controlled by the processing unit.

* * * * *